United States Patent
Testa et al.

(10) Patent No.: US 9,614,637 B2
(45) Date of Patent: Apr. 4, 2017

(54) OPTICAL ROUTING APPARATUS AND METHOD

(75) Inventors: Francesco Testa, Pomezia Rome (IT); Paolo Pintus, Pisa (IT); Fabrizio Di Pasquale, Pisa (IT); Antonio D'Errico, Calci (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 177 days.

(21) Appl. No.: 14/404,950

(22) PCT Filed: Jun. 8, 2012

(86) PCT No.: PCT/EP2012/060850
§ 371 (c)(1),
(2), (4) Date: Dec. 1, 2014

(87) PCT Pub. No.: WO2013/182246
PCT Pub. Date: Dec. 12, 2013

(65) Prior Publication Data
US 2015/0215066 A1    Jul. 30, 2015

(51) Int. Cl.
*H04J 14/00* (2006.01)
*H04J 14/02* (2006.01)
(Continued)

(52) U.S. Cl.
CPC ...... *H04J 14/0212* (2013.01); *H04J 14/0217* (2013.01); *H04J 14/06* (2013.01);
(Continued)

(58) Field of Classification Search
CPC .... H04J 14/0212; H04J 14/0217; H04J 14/06; H04J 14/0209; H04J 14/0213;
(Continued)

(56) References Cited

U.S. PATENT DOCUMENTS 5,973,809 A * 10/1999 Okayama ........... H04Q 11/0005
                                                                398/48
6,195,187 B1 * 2/2001 Soref ................. G02B 6/12007
                                                                398/9
(Continued)

FOREIGN PATENT DOCUMENTS

EP        1 043 859 A2    10/2000
JP     EP 1043859 A2 *    10/2000   .......... H04J 14/0208
(Continued)

OTHER PUBLICATIONS

ITU-T Recommendation G.694.1 "Series G: Transmission Systems and Media, Digital Systems & Networks; Transmission media characteristics—Characteristics of optical components and subsystems; Spectral grids for WDM applications: DWDM frequency grid" Jun. 2002, pp. 1-14.
(Continued)

*Primary Examiner* — Ken N Vanderpuye
*Assistant Examiner* — Abbas H Alagheband
(74) *Attorney, Agent, or Firm* — Leffler Intellectual Property Law, PLLC (57) ABSTRACT

Optical add and drop switch and aggregator apparatus comprising: N first wavelength selective routing apparatus each configured to split a wavelength multiplexed input signal into L sub-signals; demultiplexers each configured to demultiplex a respective sub-signal into K optical signals; output ports each configured to output a respective output optical signal; add ports configured to receive optical signals to be added; M second wavelength selective routing apparatus each having X outputs, each said apparatus being configured to receive optical signals from a respective add port and to route each received optical signal to a respective one of its outputs; drop ports configured to output optical signals to be dropped; and a switch matrix coupled between the demultiplexers, the output ports, the drop ports and the
(Continued)

second wavelength selective routing apparatus, the switch matrix comprising a plurality of optical switches arranged in XM columns and KLN rows.

14 Claims, 10 Drawing Sheets

(51) Int. Cl.
*H04Q 11/00* (2006.01)
*H04J 14/06* (2006.01)

(52) U.S. Cl.
CPC ...... *H04Q 11/0005* (2013.01); *H04J 14/0209* (2013.01); *H04J 14/0213* (2013.01); *H04Q 2011/0016* (2013.01); *H04Q 2011/0035* (2013.01)

(58) Field of Classification Search
CPC ........ H04J 14/00; H04J 14/02; H04J 14/0206; H04J 14/0208; H04Q 11/0005; H04Q 2011/0016; H04Q 2011/0035; H04Q 11/00; H04Q 11/0066; H04Q 2011/0009; H04Q 2011/0026; H04Q 2011/0039; H04Q 2011/0047; H04Q 2011/0049; H04Q 2011/0058
USPC ..... 398/48, 9, 49, 50, 79, 82, 83, 87, 24, 52
See application file for complete search history.

(56) References Cited

U.S. PATENT DOCUMENTS

| | | | |
|---|---|---|---|
| 6,208,442 B1* | 3/2001 | Liu | G02B 6/29302 398/9 |
| 6,344,912 B1* | 2/2002 | Hajjar | H04J 14/0212 385/16 |
| 6,512,615 B2* | 1/2003 | Wu | G02B 6/272 398/49 |
| 6,519,060 B1* | 2/2003 | Liu | H04J 14/0206 398/49 |
| 6,552,833 B2* | 4/2003 | Liu | G02B 6/29302 398/65 |
| 6,606,427 B1* | 8/2003 | Graves | G02B 6/3849 385/17 |
| 6,621,632 B2* | 9/2003 | Zhou | G02B 6/29358 359/577 |
| 6,928,244 B1* | 8/2005 | Goldstein | G02B 6/356 385/17 |
| 6,963,684 B2* | 11/2005 | Bhardwaj | G02B 6/12021 385/15 |
| 7,869,711 B2* | 1/2011 | Ji | H04J 14/02 398/43 |
| 9,112,636 B2* | 8/2015 | Testa | H04J 14/0212 |
| 2001/0038479 A1* | 11/2001 | Liu | G02B 6/29302 398/82 |
| 2002/0118913 A1* | 8/2002 | Maeda | H04J 14/0212 385/24 |
| 2002/0163693 A1* | 11/2002 | Rubissa | H04Q 11/0005 398/82 |
| 2003/0007208 A1* | 1/2003 | Shibagaki | H04Q 11/0005 398/79 |
| 2003/0210870 A1* | 11/2003 | Graves | H04Q 11/0005 385/71 |
| 2005/0002600 A1* | 1/2005 | Ducellier | G02B 6/12011 385/17 |
| 2007/0274715 A1* | 11/2007 | Pichler | H04J 14/0212 398/48 |
| 2008/0181605 A1* | 7/2008 | Palacharla | H04J 14/0204 398/50 |
| 2008/0193133 A1* | 8/2008 | Krug | G02B 6/12007 398/83 |
| 2011/0188853 A1* | 8/2011 | Schimpe | H04J 14/0208 398/38 |

FOREIGN PATENT DOCUMENTS

WO 01/89127 A2 11/2001
WO 2012/152343 A1 11/2012

OTHER PUBLICATIONS

PCT International Search Report, mailed Mar. 22, 2013, in connection with International Application No. PCT/EP2012/060850, all pages.

Colbourne, P. et al. "ROADM Switching Technologies" OSA/OFC/NFOEC 2011, Optical Society of America, OTuD1.pdf, pp. 1-43 (submitted in four parts).

Gringeri, S. et al. "Flexible Architectures for Optical Transport Nodes and Networks" IEEE Communications Magazine, Jul. 2010, pp. 40-50.

Jensen, R. et al. "Colourless, Directionless, Contentionless ROADM Architecture Using Low-Loss Optical Matrix Switches" ECOC 2010, Sep. 19-23, 2010, Torino, Italy, pp. 1-3.

Lea, C. et al. "A New Approach to the Wavelength Nonuniformity Problem of Silicon Photonic Microrings" IEEE Journal of Lightwave Technology, vol. 29, No. 17, Sep. 1, 2011, pp. 2552-2559.

Grek, B. et al. "Monolithically integrated 32 × four-channel client reconfigurable optical add/drop multiplexer on planar lightwave circuit" IEEE Photonics Technology Letters, IEEE Service Center, Piscataway, NJ, US, vol. 15, No. 10, Oct. 1, 2003, pp. 1413-1415, XP011101385, ISSN: 1041-1135.

Chuan Pu et al., Client-Configurable Eight-Channel Optical Add/Drop Miltiplexer Using Micromachining Technology, IEEE Photonics Technology Letters, vol. 12, No. 12, Dec. 2000, pp. 1665-1667.

* cited by examiner

OPTICAL ROUTING APPARATUS AND METHOD

TECHNICAL FIELD

The invention relates to an optical add and drop switch and aggregator apparatus and to an optical multiplexer comprising the optical add and drop switch and aggregator apparatus. The invention further relates to a method of routing optical signals through an optical switch matrix.

BACKGROUND

In current reconfigurable optical add/drop multiplexers, ROADM, flexibility is only provided for handling wavelength channels coming from the network (by-pass wavelengths) that can be remotely configured at each node to be routed from any direction to any direction. At the end points the add and drop wavelengths are rigidly assigned to a fixed direction and a fixed colour/wavelength port can only be reconfigured manually.

Next generation ROADM will need to be more flexible, with colorless, directionless and contentionless operation so as to extend the flexibility and automation to the end points where transponders are connected a communications network node. Colorless, directionless and contentionless operation will enable the configuration, without any manual intervention, of add/drop wavelength channels to/from any direction (directionless operation), independent of the transponder wavelength (colorless operation) and enabling multiple signals with the same wavelength to be handled by the same add and drop structure (contentionless operation).

Dynamic colorless, directionless and contentionless add/drop access will give network operators the ability to optimize network resource utilization, eliminate manual intervention, and support re-routing functions in case of faults in a cost effective way. To add this flexibility to existing ROADMs that use free space optics based 1×N wavelength selective switches, WSS, for optical line switching, new optical switching node architectures have been proposed based on the use of an additional block referred to as an Add and Drop Switch and Aggregator block (ADSA).

Three main potential implementations of an ADSA have been proposed:

1) An ADSA based on arrays of 1×N WSS in conjunction with arrays of 8×1 space switches, as disclosed in P. Colbourne et al, 'ROADM Switching Technologies' Optical Fiber Communications, OFC, 2011, paper OTuD1.

2) An ADSA based on a distribute-switch-select architecture in which splitters/combiners are used in conjunction with 1×N optical switches and tunable filters, as disclosed in FIG. 5 of S. Gringeri et al: 'Flexible Architectures for Optical Transport Nodes and Networks' IEEE Communication Magazines, July 2010.

3) An ADSA including a high port count optical cross connect, OXC, based on free space optics and micro-electromechanical system, MEMS, technology, as disclosed in R. Jensen at al, 'Colourless, Directionless, Contentionless ROADM Architecture Using Low-Loss Optical Matrix Switches', European Conference on Optical Communications, ECOC, 2010 paper Mo.2.D.2.

Each of these proposed ADSAs have associated problems. ADSA 1) has low optical loss but has the disadvantage of high cost, room occupancy and complexity due to the high number of WSS in the array that increases with the transponder count. ADSA 2) has the disadvantage of high optical loss that increases with the transponder count due to signal distribution and switching. This leads to an increase in ROADM cost, footprint and power consumption, due to the required levels of optical amplification. ADSA 3) has the disadvantage of high cost and large footprint due to the use of 3D MEMS technologies, plus the complex control circuitry required by that technology and the need to install the ADSA with the maximum possible sized switch matrix even if a lower number of transponders are initially being used.

Further implementations of an ADSA for optical communications networks are disclosed in PCT application no. PCT/EP2011/070543. A first ADSA architecture disclosed in PCT/EP2011/070543 comprises a first plurality of drop optical switches for dropping wavelength channels arranged in a first switching matrix and a second plurality of add optical switches arranged in a second switching matrix for adding wavelength channels. A second ADSA architecture disclosed in PCT/EP2011/070543 comprises a plurality of add/drop optical switches arranged in a switching matrix. The drop switches and the add/drop switches may comprise microring resonators or Mach-Zehnder interferometer based broadband photonic switches. The add switches may comprise wavelength tuneable photonic switches.

SUMMARY

It is an object to provide an improved optical add and drop switch and aggregator apparatus. It is a further object to provide an improved optical multiplexer. It is a further object to provide an improved method of routing optical signals through an optical switch matrix.

A first aspect of the invention provides optical add and drop switch and aggregator apparatus comprising a plurality, N, of first wavelength selective routing apparatus, a plurality of demultiplexers, a plurality of output ports, a plurality of add ports, a plurality, M, of second wavelength selective routing apparatus, a plurality of drop ports and a switch matrix coupled between the demultiplexers, the output ports, the drop ports and the second wavelength selective routing apparatus. The first wavelength selective routing apparatus are each configured to split a respective wavelength multiplexed input optical signal comprising a plurality of wavelengths into a plurality, L, of sub-signals. Each sub-signal is a respective sub-set of the plurality of wavelengths. The demultiplexers are each configured to demultiplex a respective sub-signal into a plurality, K, of optical signals. The output ports are each configured to output a respective output optical signal. The add ports are configured to receive optical signals to be added. The second wavelength selective routing apparatus each have a plurality, X, of outputs. Each second wavelength selective routing apparatus is configured to receive optical signals from a respective add port and to route each received optical signal to a respective one of its outputs. The drop ports are configured to output optical signals to be dropped. The switch matrix comprises a plurality of optical switches arranged in a plurality, XM, of columns and a plurality, KLN, of rows.

The first and second wavelength selective routing apparatus may increase the number of rows and columns in the switch matrix as compared to the prior art ADSA devices. The increased number of rows and columns may reduce the number of optical switches in the switch matrix that an input optical signal traverses to reach its respective drop port or output port and may reduce the number of optical switches that an optical signal to be added traverses to reach its respective output port. The reduction in the number of optical switches traversed by an optical signal may reduce optical loss in the ADSA apparatus as compared to the prior art devices and may enable the capacity of the ADSA apparatus to be increased as compared to the prior art devices. The wavelength selective routing apparatus may also enable optical switches to be used which have a smaller free spectral range, FSR, than in the prior art devices.

In an embodiment, each first wavelength selective routing apparatus comprises a wavelength selective optical splitter. In an embodiment, the wavelength selective optical splitter is an optical bandsplit filter. Using an optical bandsplit filter may enable a wavelength multiplexed input optical signal to be split into a plurality of sub-band signals. This may enable optical switches to be used which have a smaller free spectral range, FSR, than in the prior art devices.

In an embodiment, each first wavelength selective routing apparatus further comprises a said plurality, L, of first wavelength selective optical routing devices each arranged to receive a respective sub-signal. Each first wavelength selective optical routing device comprises a plurality, Y, of outputs and is configured to route optical signals having adjacent wavelengths to different ones of the plurality of outputs. Each demultiplexer is arranged to receive the optical signals from a respective one of the outputs and is configured to demultiplex the received optical signals into said plurality, K, of optical signals. The optical switches of the switch matrix are arranged in a plurality, KLYN, of rows.

The first wavelength selective optical routing devices may spatially separate adjacent wavelengths within the switch matrix, which may increase the channel spacing of channels passing through single switch elements of the switch matrix as compared to the prior art devices. This may reduce crosstalk between wavelength adjacent channels within the switch matrix. The cascaded arrangement of wavelength selective optical splitters and first wavelength selective optical routing devices may further reduce the number of optical switches in the switch matrix that an optical signal traverses to reach its respective drop port or output port.

In an embodiment, each second wavelength selective routing apparatus comprises a second wavelength selective optical routing device having a plurality, Z, of outputs. The second wavelength selective optical routing device is configured to route each received optical signal to a respective one of the outputs. Each second wavelength selective routing apparatus additionally comprises a said plurality, Z, of first wavelength selective optical routing devices each having a said plurality, Y, of outputs.

The cascaded arrangement of first and second wavelength selective optical routing devices may further reduce the number of optical switches in the switch matrix that an optical signal traverses to reach its respective drop port or output port.

In an embodiment, each second wavelength selective optical routing device comprises a wavelength selective optical splitter. In an embodiment, the wavelength selective optical splitter is an optical bandsplit filter. Using an optical bandsplit filter may enable an optical signal to be added to be routed into one of a plurality of wavelength sub-bands. This may enable optical switches to be used which have a smaller free spectral range, FSR, than in the prior art devices.

In an embodiment, each first wavelength selective optical routing device comprises an optical interleaver having first and second outputs. Each wavelength has a wavelength index number and each interleaver is arranged to route optical signals having an even wavelength index number to the first output and is arranged to route optical signals having an odd wavelength index number to the second output. The interleavers may spatially separate adjacent wavelengths within the switch matrix. The interleavers may double the channel spacing of the switch matrix as compared to the prior art devices.

In an embodiment, the optical add and drop switch and aggregator further comprises a plurality of multiplexers and a plurality of optical signal combiners. The multiplexers are each configured to multiplex a plurality of output optical signals into a respective output optical sub-signal. The optical signal combiners are each configured to combine a plurality of output optical sub-signals into a respective wavelength multiplexed output optical signal. The switch matrix is coupled between the demultiplexers, the multiplexers, the drop ports and the second wavelength selective routing apparatus.

The ADSA apparatus may combine optical signals output from the switch matrix into wavelength multiplexed output optical signals for each respective output port.

In an embodiment, each optical switch comprises one of an optical micro-ring resonator, a wavelength selective photonic switch and a broadband photonic switch. The increase in the FRS provided by the wavelength selective optical routing devices may enable optical micro-ring resonators having a larger diameter to be used as compared with the prior art devices.

In an embodiment, each multiplexer is an arrayed waveguide grating.

In an embodiment, each demultiplexer is an arrayed waveguide grating.

In an embodiment, the optical add and drop switch and aggregator apparatus is a silicon photonic device.

A second aspect of the invention provides an optical add drop multiplexer comprising an optical add and drop switch and aggregator apparatus. The optical add and drop switch and aggregator apparatus comprises a plurality, N, of first wavelength selective routing apparatus, a plurality of demultiplexers, a plurality of output ports, a plurality of add ports, a plurality, M, of second wavelength selective routing apparatus, a plurality of drop ports and a switch matrix coupled between the demultiplexers, the output ports, the drop ports and the second wavelength selective routing apparatus. The first wavelength selective routing apparatus are each configured to split a respective wavelength multiplexed input optical signal comprising a plurality of wavelengths into a plurality, L, of sub-signals. Each sub-signal is a respective sub-set of the plurality of wavelengths. The demultiplexers are each configured to demultiplex a respective sub-signal into a plurality, K, of optical signals. The output ports are each configured to output a respective output optical signal. The add ports are configured to receive optical signals to be added. The second wavelength selective routing apparatus each have a plurality, X, of outputs. Each second wavelength selective routing apparatus is configured to receive optical signals from a respective add port and to route each received optical signal to a respective one of its outputs. The drop ports are configured to output optical signals to be dropped. The switch matrix comprises a plurality of optical switches arranged in a plurality, XM, of columns and a plurality, KLN, of rows.

The first and second wavelength selective routing apparatus may increase the number of rows and columns in the ADSA switch matrix as compared to the prior art optical add drop multiplexers. The increased number of rows and columns may reduce the number of optical switches in the switch matrix that an input optical signal traverses to reach its respective drop port or output port and may reduce the number of optical switches that an optical signal to be added traverses to reach its respective output port. The reduction in the number of optical switches traversed by an optical signal may reduce optical loss in the optical add drop multiplexer as compared to the prior art devices and may enable the capacity of the ADSA apparatus to be increased as compared to the prior art devices. The wavelength selective routing apparatus may also enable optical switches to be used which have a smaller free spectral range, FSR, than in the prior art devices.

In an embodiment, each first wavelength selective routing apparatus comprises a wavelength selective optical splitter. In an embodiment, the wavelength selective optical splitter is an optical bandsplit filter. Using an optical bandsplit filter may enable a wavelength multiplexed input optical signal to be split into a plurality of sub-band signals. This may enable optical switches to be used which have a smaller free spectral range, FSR, than in the prior art devices.

In an embodiment, each first wavelength selective routing apparatus further comprises a said plurality, L, of first wavelength selective optical routing devices each arranged to receive a respective sub-signal. Each first wavelength selective optical, routing device comprises a plurality, Y, of outputs and is configured to route optical signals having adjacent wavelengths to different ones of the plurality of outputs. Each demultiplexer is arranged to receive the optical signals from a respective one of the outputs and is configured to demultiplex the received optical signals into said plurality, K, of optical signals. The optical switches of the switch matrix are arranged in a plurality, KLYN, of rows.

The first wavelength selective optical routing devices may spatially separate adjacent wavelengths within the switch matrix, which may increase the channel spacing of channels passing through single switch elements of the switch matrix as compared to the prior art devices. This may reduce crosstalk between wavelength adjacent channels within the switch matrix. The cascaded arrangement of wavelength selective optical splitters and first wavelength selective optical routing devices may further reduce the number of optical switches in the switch matrix that an optical signal traverses to reach its respective drop port or output port.

In an embodiment, each second wavelength selective routing apparatus comprises a second wavelength selective optical routing device having a plurality, Z, of outputs. The second wavelength selective optical routing device is configured to route each received optical signal to a respective one of the outputs. Each second wavelength selective routing apparatus additionally comprises a said plurality, Z, of first wavelength selective optical routing devices each having a said plurality, Y, of outputs.

The cascaded arrangement of first and second wavelength selective optical routing devices may further reduce the number of optical switches in the switch matrix that an optical signal traverses to reach its respective drop port or output port.

In an embodiment, each second wavelength selective optical routing device comprises a wavelength selective optical splitter. In an embodiment, the wavelength selective optical splitter is an optical bandsplit filter. Using an optical bandsplit filter may enable an optical signal to be added to be routed into one of a plurality of wavelength sub-bands. This may enable optical switches to be used which have a smaller free spectral range, FSR, than in the prior art devices.

In an embodiment, each first wavelength selective optical routing device comprises an optical interleaver having first and second outputs. Each wavelength has a wavelength index number and each interleaver is arranged to route optical signals having an even wavelength index number to the first output and is arranged to route optical signals having an odd wavelength index number to the second output. The interleavers may spatially separate adjacent wavelengths within the switch matrix. The interleavers may double the channel spacing of the switch matrix as compared to the prior art devices.

In an embodiment, the optical add and drop switch and aggregator further comprises a plurality of multiplexers and a plurality of optical signal combiners. The multiplexers are each configured to multiplex a plurality of output optical signals into a respective output optical sub-signal. The optical signal combiners are each configured to combine a plurality of output optical sub-signals into a respective wavelength multiplexed output optical signal. The switch matrix is coupled between the demultiplexers, the multiplexers, the drop ports and the second wavelength selective routing apparatus.

The ADSA apparatus may combine optical signals output from the switch matrix into wavelength multiplexed output optical signals for each respective output port of the optical add drop multiplexer.

In an embodiment, each optical switch comprises one of an optical micro-ring resonator, a wavelength selective photonic switch and a broadband photonic switch. The increase in the FRS provided by the wavelength selective optical routing devices may enable optical micro-ring resonators having a larger diameter to be used as compared with the prior art devices.

In an embodiment, each multiplexer is an arrayed waveguide grating.

In an embodiment, each demultiplexer is an arrayed waveguide grating.

In an embodiment, the optical add and drop switch and aggregator apparatus is a silicon photonic device.

In an embodiment, the optical add drop multiplexer further comprises a second said optical add and drop switch and aggregator apparatus, as described above, and a plurality, N, of polarisation beam splitters. The polarisation beam splitters are each configured to receive a respective wavelength multiplexed input optical signal of an unknown polarisation and to route an input optical signal having a first polarisation into a first direction and to route an input optical signal having a second polarisation into a second direction. A first one of the optical add and drop switch and aggregators apparatus is arranged to receive the input optical signals of the first polarisation and a second one of the optical add and drop switch and aggregators apparatus is arranged to receive the input optical signals of the second polarisation.

The optical add drop multiplexer may be used with WDM input optical signals of an unknown polarisation.

In an embodiment, the optical add drop multiplexer further comprises a second plurality of polarisation beam splitters, provided before each add port. The polarisation beam splitters are each configured to receive a respective wavelength multiplexed input optical signal of an unknown polarisation and to route an input optical signal having a first polarisation into a first direction and to route an input optical signal having a second polarisation into a second direction. The optical add drop multiplexer may be used with optical signals to be added which have an unknown polarisation.

In an embodiment, the optical add drop multiplexer further comprises a plurality of first polarization beam combiners and a plurality of second polarization beam combiners The first polarization beam combiners are each configured to combine optical signals of the first and second polarization to be dropped to a respective drop port. The second polarization beam combiners are each configured to combine output optical signals of the first and second polarization to be output at a respective output.

In an embodiment, the optical add drop multiplexer is a reconfigurable optical add drop multiplexer.

A third aspect of the invention provides a method of routing optical signals through an optical switch matrix. The method comprises step a. of receiving a wavelength multiplexed input optical signal comprising a plurality of wavelengths. The method comprises step b. of splitting the wavelength multiplexed input optical signal into a plurality of sub-signals. Each sub-signal is a respective sub-set of the plurality of wavelengths. The method comprises step c. of demultiplexing each sub-signal into a plurality of optical signals. The method comprises step d. of routing each one of said optical signals having a by-pass wavelength through the switch matrix to a respective output. The method comprises step e. of routing each one of said optical signals to be dropped through the switch matrix to a respective drop port. The method comprises step f. of routing at least one optical signal to be added through the switch matrix to a respective output.

Splitting the wavelength multiplexed input optical signal into a plurality of sub-signal may enable a switch matrix having a larger number of rows and columns to be used as compared to prior art optical switch matrices. The method may therefore reduce the number of optical switches in the switch matrix that an input optical signal traverses to reach its respective drop port or output and may reduce the number of optical switches that an optical signal to be added traverses to reach its respective output port. Implementing the method may reduce optical loss during routing of optical signals and may enable a larger number of optical signals to be simultaneously routed. The method may also enable routing of optical signals across a switch matrix having optical switches with a smaller free spectral range, FSR, than in the prior art.

In an embodiment, the method further comprises splitting the optical signals of each sub-signal into a plurality of subset signals such that optical signals having adjacent wavelengths are in different subset signals. The method further comprises spatially separating the subset signals. In step c. the subset signals are demultiplexed into a plurality of optical signals. Splitting the optical signals and spatially separating them may reduce crosstalk between wavelength adjacent optical signal channels.

A fourth aspect of the invention provides a data carrier having computer readable instructions embodied therein for providing access to resources available on a processor. The computer readable instructions comprise instructions to cause the processor to perform any of the above steps of the method of routing optical signals through an optical switch matrix.

In an embodiment, the data carrier is a non-transitory data carrier.

Embodiments of the invention will now be described, by way of example only, with reference to the accompanying drawings.

DETAILED DESCRIPTION

Figure 1:
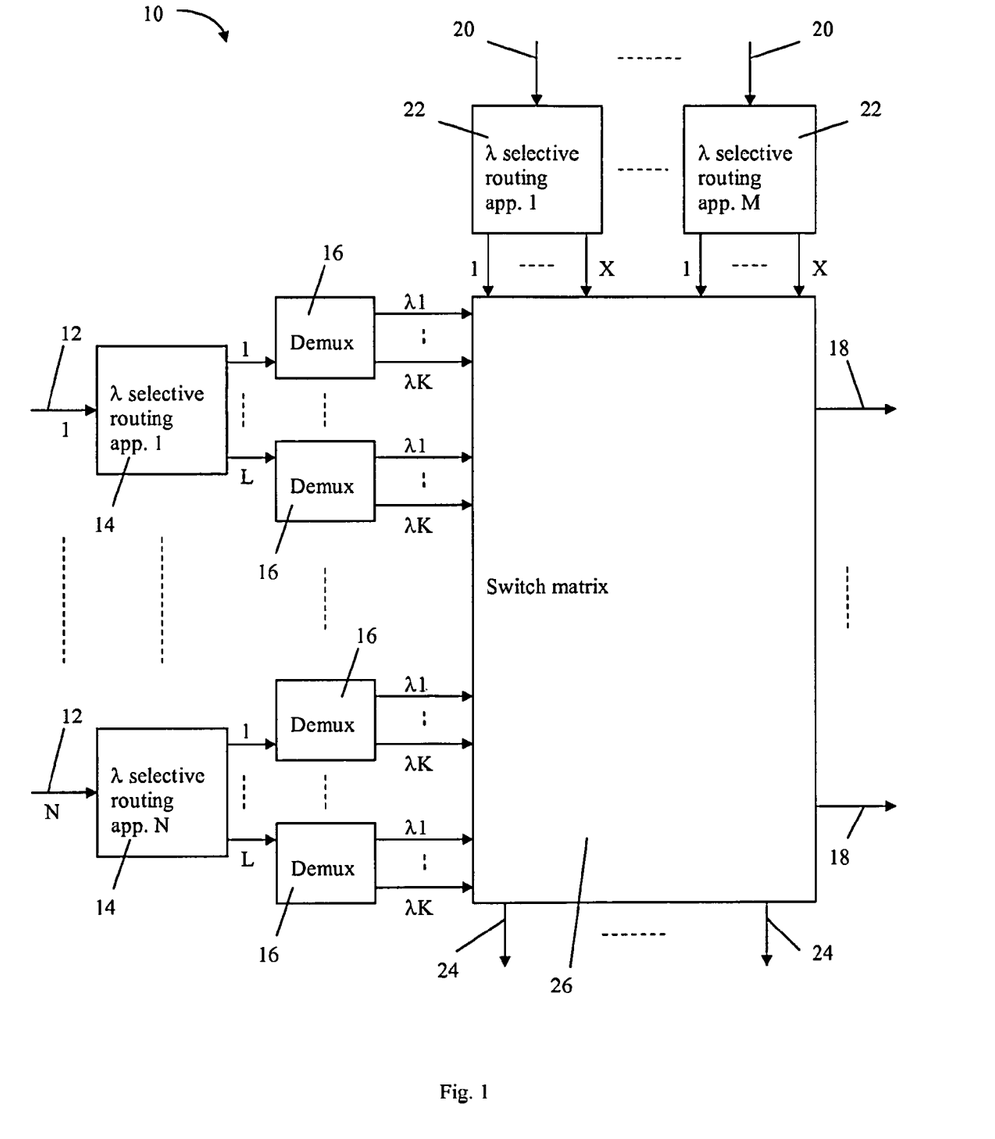
FIG. 1 is a schematic representation of optical add and drop switch and aggregator apparatus according to a first embodiment of the invention.

Referring to FIG. 1 a first embodiment of the invention provides optical add and drop switch and aggregator (ADSA) apparatus 10 comprising a plurality, N, of first wavelength selective routing apparatus 14, a plurality of demultiplexers 16, a plurality of output ports 18, a plurality of add ports 20, a plurality, M, of second wavelength selective routing apparatus 22, a plurality of drop ports 24 and a switch matrix 26.

Each first wavelength selective routing apparatus 14 is configured to split a respective wavelength multiplexed input optical signal comprising a plurality of wavelengths, received from a respective input port 12, into a plurality, L, of sub-signals. Each sub-signal is a respective subset of the plurality of wavelengths. Each demultiplexer 16 is configured to demultiplex a respective sub-signal into a plurality, K, of optical signals, λ1 to λK. The optical signals are each coupled into a row of the switch matrix 26.

Each output port 18 is configured to output a respective output optical signal. Each add port 20 is configured to receive optical signals to be added. Each drop port 24 is configured to output optical signals to be dropped.

Each second wavelength selective routing apparatus 22 has a plurality, X, of outputs. Each second wavelength selective routing apparatus 22 is configured to receive optical signals from a respective add port 20 and to route each optical signal to a respective one of its outputs. Each output is coupled to a respective column of the switch matrix 26.

The switch matrix 26 is coupled between the demultiplexers 16, the output ports 18, the drop ports 24 and the outputs of the second wavelength selective routing apparatus 22. The switch matrix 26 comprises a plurality of optical switches arranged in a plurality, XM, of columns, and a plurality, KLN, of rows.

An input wavelength multiplexed optical signal received at an input port 12 is received at the respective first wavelength selective routing apparatus 14 and split into a plurality, L, of sub-signals, each of which, are routed to a respective one of L output ports of the first wavelength selective routing apparatus 14. Each sub-signal, 1 to L is demultiplexed by a respective demultiplexer 16 into a plurality, K, of optical signals (wavelengths λ1 to λK). Each of the demultiplexed optical signals is coupled into a respective row of the switch matrix 26.

Optical signals having bypass wavelengths are transmitted along their respective row of the switch matrix 26 to a respective output port 18. Optical signals having drop wavelengths are transmitted along their respective row until they reach the optical switch corresponding to the drop port 24 to which they are to be dropped. The relevant optical switch switches the optical signal to be dropped into the switch matrix column connected to its destination drop port 22 and the optical signal is transmitted down the relevant column to the drop port 22.

Optical signals to be added are received at a respective add port 20 and are coupled into a respective switch matrix column by their respective second wavelength selective routing apparatus 22. An optical signal to be added is transmitted down its respective column until it reaches the optical switch corresponding to its destination output port 18. The optical switch switches the optical signal to be added into the row connected to its destination output port 18 and the optical signal is transmitted along the row to the output port 18.

Figure 2:
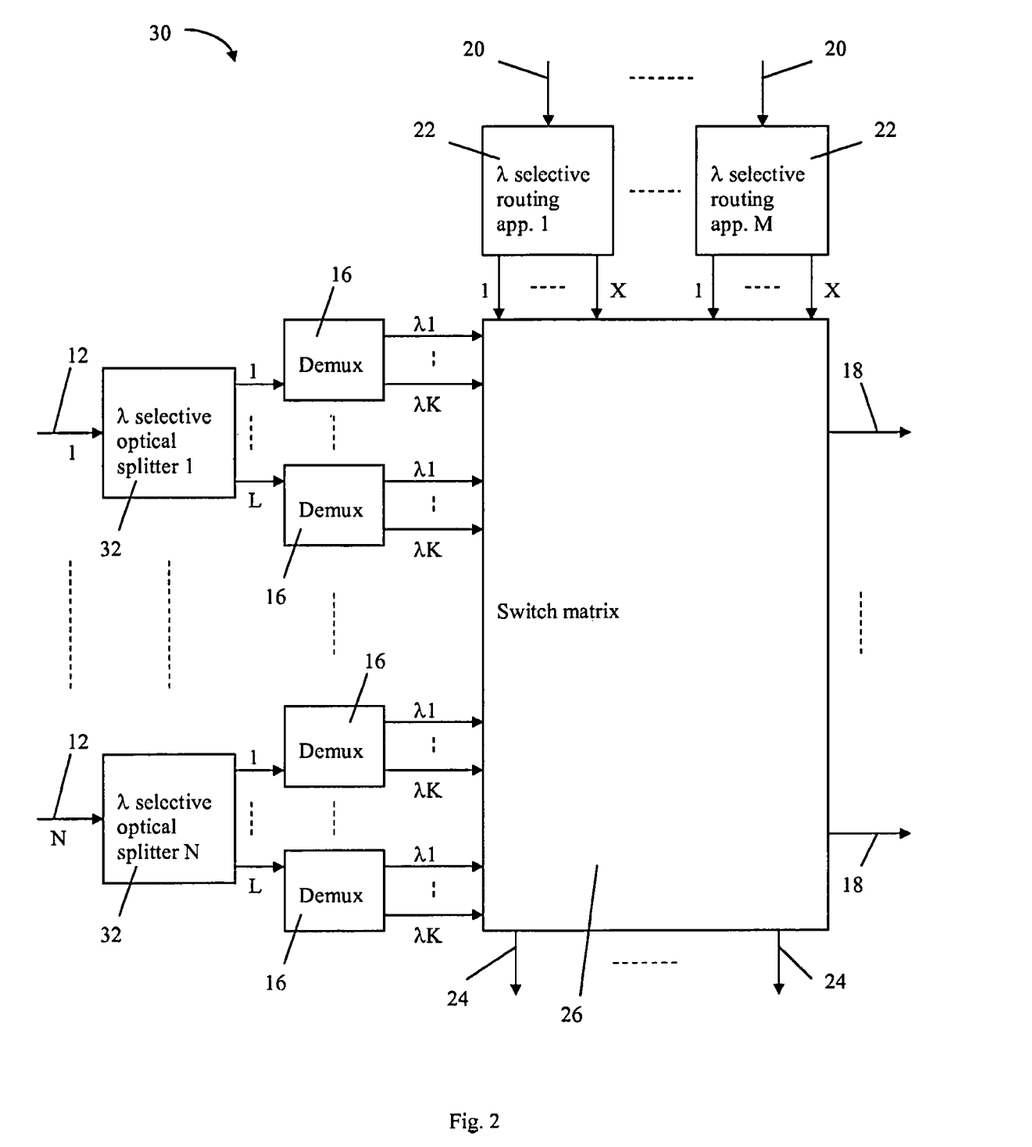
FIG. 2 is a schematic representation of optical add and drop switch and aggregator apparatus according to a second embodiment of the invention.

An ADSA apparatus 30 according to a second embodiment of the invention is shown in FIG. 2. The ADSA apparatus 30 of this embodiment is similar to the ADSA apparatus 10 of FIG. 1, with the following modifications. The same reference numbers are retained for corresponding features.

In this embodiment each first wavelength selective routing apparatus is a wavelength selective optical splitter 32. Each optical splitter is configured to split the respective wavelength multiplexed input optical signal into a plurality, L, of sub-signals.

Figure 3:
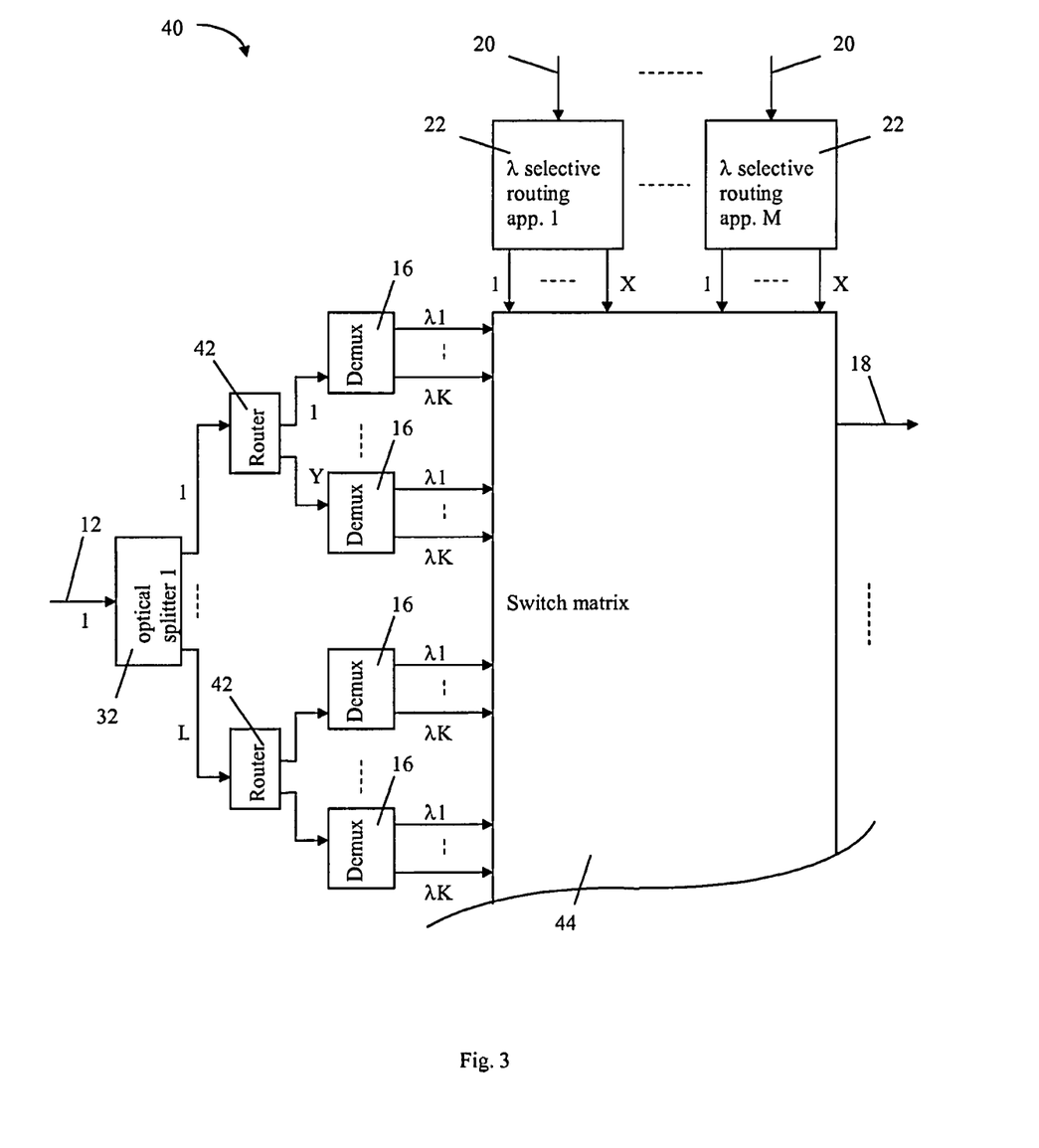
FIG. 3 is a schematic representation of part of optical add and drop switch and aggregator apparatus according to a third embodiment of the invention.

Referring to FIG. 3, a third embodiment of the invention provides ADSA apparatus 40 which is similar to the ADSA apparatus 30 of FIG. 2, with the following modifications. The same reference numbers are retained for corresponding features. Only part of the ADSA apparatus 40 is shown in FIG. 3 for reasons of scale and clarity.

In this embodiment each first wavelength selective routing apparatus comprises an optical splitter 32 and a plurality, L, of first wavelength selective optical routing devices 42. Each routing device 42 is coupled to an output port of its respective optical splitter 32 and is arranged to receive a respective sub-signal from the optical splitter 32. Each routing device 42 comprises a plurality, Y, of outputs and is configured to route optical signals having adjacent wavelengths to different ones of its outputs. More than one optical signal, each at a different wavelength, is routed to each output by a routing device 42. The optical signals output from the routing devices 42 are received by respective demultiplexers 16. Each demultiplexer is configured to demultiplex the received optical signals into a plurality, K, of optical signals.

The optical switches of the switch matrix 44 are arranged in a plurality, XM, of columns and a plurality, KLYN, of rows.

Figure 4:
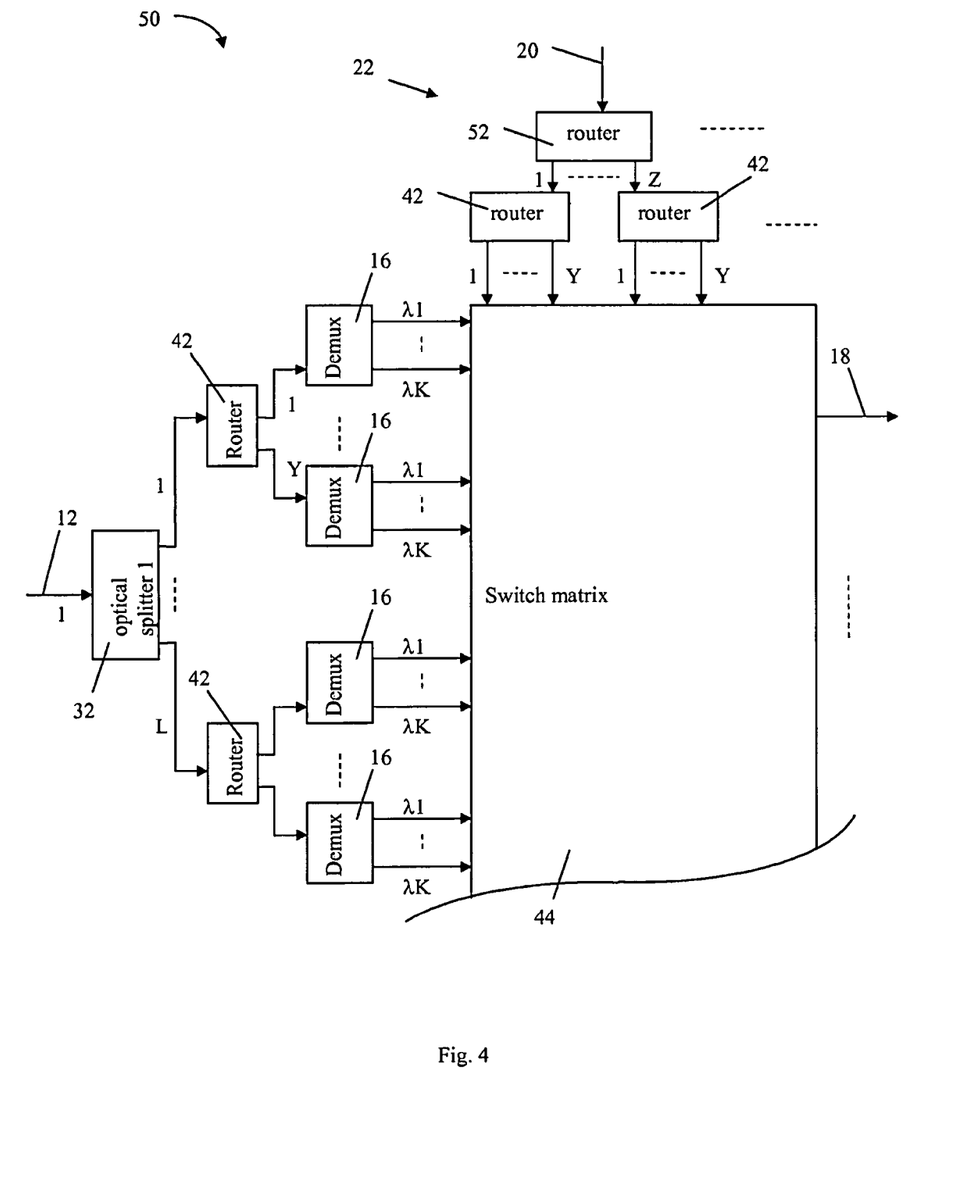
FIG. 4 is a schematic representation of part of optical add and drop switch and aggregator apparatus according to a fourth embodiment of the invention.

Part of an ADSA apparatus 50 according to a fourth embodiment of the invention is shown in FIG. 4. The ADSA apparatus 50 of this embodiment is similar to the ADSA apparatus 40 of FIG. 3, with the following modifications. The same reference numbers are retained for corresponding features.

In this embodiment each second wavelength selective routing apparatus 22 comprises a second wavelength selective routing device 52 and a plurality of first wavelength selective optical routing devices 42. Each second routing device 52 has a plurality, Z, of outputs each of which is coupled to a respective one of the first routing devices 42. Each second routing device 52 is configured to route an optical signal received from its respective add port 20 to a respective one of its outputs, 1 to Z, each routing device 52 being configured to route optical signals of a plurality of different wavelengths to each output. Each first routing device 42 is arranged to route each optical signal received from its respective second routing device 52 to one of its outputs, 1 to Y, according to the wavelength of the optical signal. Each optical signal is thereby routed to a respective column of the switch matrix 44.

Figure 5:
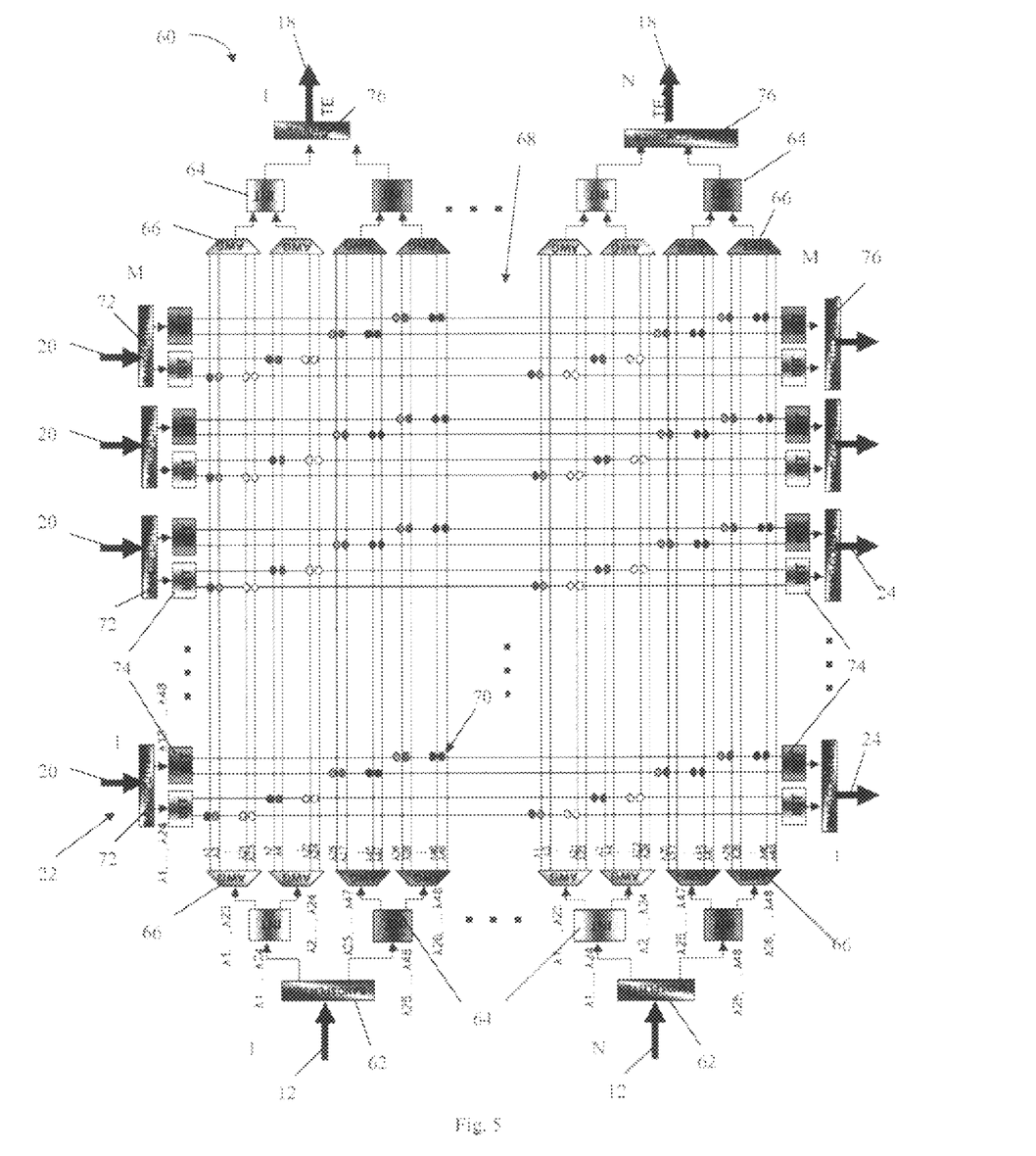
FIG. 5 is a schematic representation of optical add and drop switch and aggregator apparatus according to a fifth embodiment of the invention.

An ADSA apparatus 60 according to a fifth embodiment of the invention is shown in FIG. 5. The ADSA apparatus 60 of this embodiment is similar to the ADSA apparatus 50 of FIG. 4, with the following modifications. The same reference numbers are retained for corresponding features.

In this embodiment each first wavelength selective routing apparatus comprises a bandsplit optical filter 62 and two routing devices in the form of optical interleavers 64. Each bandsplit filter 62 is arranged to receive a wavelength multiplexed input optical signal from the respective input port 12 and is configured to split the received input optical signal into two sub-band signals. The first sub-band signal in this example comprises wavelengths λ1 to λ24 and the second sub-band signal comprises wavelengths λ25 to λ48. Each interleaver 64 is configured to route optical signals having an even wavelength index number (λ2, λ4, etc.) to its first output and is configured to route optical signals having an odd wavelength index number (λ1, λ3, etc.) to its second output.

In this embodiment each wavelength demultiplexer comprises an arrayed waveguide grating, AWG, 66 which is arranged to receive a wavelength multiplexed optical signal from the respective interleaver output. Each AWG 66 is configured to demultiplex the wavelength multiplexed optical signal into a plurality, K, of optical signals, each having a different wavelength.

Each second wavelength selective routing apparatus 22 comprises a bandsplit filter 72 and first and second optical interleavers 74. Each bandsplit filter 72 is arranged to route an optical signal received from a respective add port 20 to one of its two outputs. Wavelengths in the first sub-band λ1 to λ25 are routed to a first output and wavelengths in the second sub-band λ26 to λ48 are routed to the second output.

Each interleaver 74 is arranged to receive an optical signal from a respective one of the bandsplit filter outputs and is configured to route the optical signal to one of its, two outputs. Optical signals having an even wavelength index are routed to a first output of the interleaver and optical signals having an odd wavelength index are routed to the second output of the interleaver. Optical signals having an even wavelength index number within the first sub-band (λ2, λ4 . . . λ24) are thereby routed to a first column of the switch matrix 68. Optical signals having an odd wavelength index number within the first sub-band (λ1, λ3 . . . λ23) are routed to a second column of the switching matrix 68. Optical signals having an even wavelength index number within the second sub-band (λ26, λ28 . . . λ48) are routed to a third column of the switching matrix 68. Optical signals having an odd index number within the second sub-band (λ25, λ27 . . . λ47) are routed to a fourth column of the switching matrix 68.

In this embodiment, the ADSA apparatus 60 additionally comprises first and second optical interleavers 74 coupled to a respective band combiner 76, before each drop port 24. Optical signals to be dropped which are transmitted down the respective four columns of the switching matrix 68 are routed to the respective drop port 24 through the respective interleaver 74 and band combiner 76.

The ADSA apparatus 60 additionally comprises four wavelength multiplexers, in the form of AWGs 66, two optical interleavers 64 and a band combiner 76 for each output port 18. The individual wavelength optical signals received from the switch matrix 68 are thereby multiplexed into a wavelength multiplexed output optical signal before being delivered to the respective output port 18.

In operation, wavelength division multiplexed, WDM, input optical signals comprising a plurality of wavelengths are received at each of the N input ports 12. Each input optical signal comprises channels to be dropped to transponder receivers (not shown and not part of this embodiment) coupled to respective drop ports 24 and by-pass channels to be routed to respective output ports 18. The input WDM signals are separated into two optical sub-bands by their respective bandsplit filters 62: a lower band comprising wavelengths $\lambda 1$ to $\lambda 24$; and an upper band comprising wavelengths $\lambda 25$ to $\lambda 48$. After band separation the interleavers 64 separate the odd wavelength channels from the even channels, and the AWG 66 de-multiplex the odd channels and the even channels. The individual optical signals, at wavelengths $\lambda 1$ to $\lambda 48$, are coupled into respective rows of the switch matrix 68.

In this example, the switch matrix is formed of optical switches 70 in the form of micro-ring resonators. By splitting the input WDM signals into two sub-bands using the bandsplit filters the FSR of the micro-ring resonators can be halved, as compared to the FSR required if each micro-ring resonator is to switch all 48 wavelength channels, and the diameter of the micro-ring can be doubled, relaxing the precision requirements of the fabrication process.

The switch matrix 68 is configured in groups of four columns for each add port and drop port pair. The first two columns carry respectively the odd and even wavelengths of the lower band and the next two columns carry the odd and even wavelengths of the higher band.

At each drop port a particular wavelength channel to be dropped will traverse one inter-leaver 74 if the wavelength selected is odd or and the other inter-leaver 74 if the wavelength is even. Finally, an optical signal to be dropped traverses the bandsplit filter 72, which acts as a band multiplexer, and is delivered to the respective drop port 24.

Optical signals to be added to the network are received at a respective add port 20. Optical signals to be added enter the bandsplit filters 72 and are delivered to one output if the wavelength belongs to the lower band and are delivered to the other output if the wavelength belongs to the upper band. The respective inter-leaver 74 separates the odd wavelengths from the even wavelengths, delivering them to two different outputs. At this stage, signals to be added arrive at the switch matrix 68 that, as explained above, is organized in a group of four columns for each add/drop port pair. In the first column only odd wavelengths of the lower band travel while in the second column travel only wavelengths of the lower band travel. In the third and fourth columns, odd and even wavelengths of the upper band travel, respectively. The optical signals to be added travel along their respective columns and are switched by respective micro-ring resonators 70 for the output direction 18 to which each optical signal is to be added.

After being transmitted across the switch matrix 68, at the end of the respective row all of the optical signals travelling to a respective output port 18 are multiplexed by a respective AWG 66, then the interleavers 64 combine the odd and even wavelength into upper and lower sub-band signals and finally the bandsplit filters 76 combine the lower and upper bands.

The combination of band splitting and wavelength interleaving reduces by a factor of four the maximum number of micro-ring resonator switches 70 traversed in the worst case by an optical signal with respect to prior art ADSA architectures. This can be seen considering an optical signal at wavelength $\lambda 1$, coming from input port 1, that is to be dropped to drop port 1. The signal enters the switch matrix 68 and encounters the first micro-ring resonator 70 by which it is switched into the column associated with drop port 1. The optical signal proceeds down the column traversing a number of micro-ring resonators 70 equal to $(K/4 \times N) - 1$, where K=number of wavelengths and N=number of input ports. In prior art ADSA architectures, which do not employ the band splitting and wavelength interleaving disclosed here, the number of micro-ring resonators that an optical signal would have to traverse on its path to the drop port is $(K \times N) - 1$.

The combination of band splitting and wavelength interleaving also results in the switch matrix 68 having a channel spacing which is double that achieved in prior art ADSA architectures, which may reduce the crosstalk between wavelength adjacent channels.

The switch matrix 68 may be constructed by monolithic integration in which all functions are integrated in the same InP (indium phosphide) or silicon or other semiconductor materials based die, or by hybrid integration in which different chips are interconnected, each one of them implementing some functions in a more convenient way. Integrating all functions in one InP or other semiconductor die is a preferred embodiment. Alternatively, different parts of the switch fabric 68 may be constructed from several connected semiconductor dies.

Figure 6:
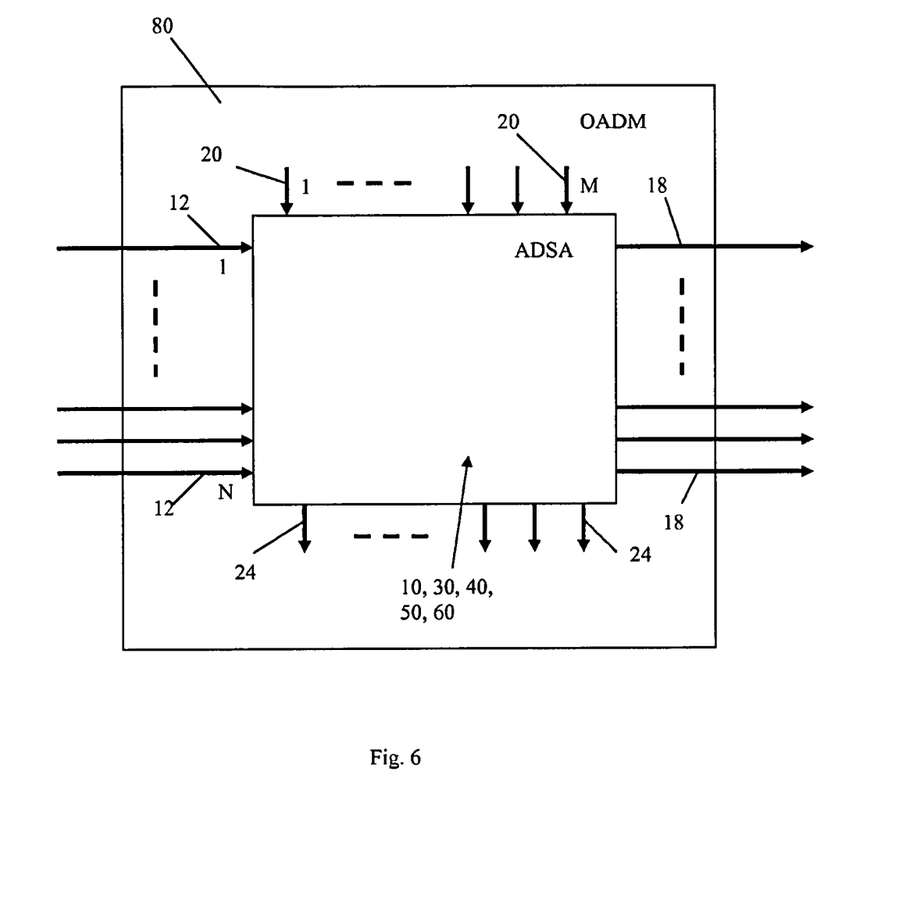
FIG. 6 is a schematic representation of optical add drop multiplexer according to a sixth embodiment of the invention.

A sixth embodiment of the invention provides an optical add drop multiplexer, OADM, 80 as shown in FIG. 6.

The OADM 80 comprises an ADSA apparatus 10, 30, 40, 50, 60 as described in any of FIGS. 1 to 5.

Figure 7:
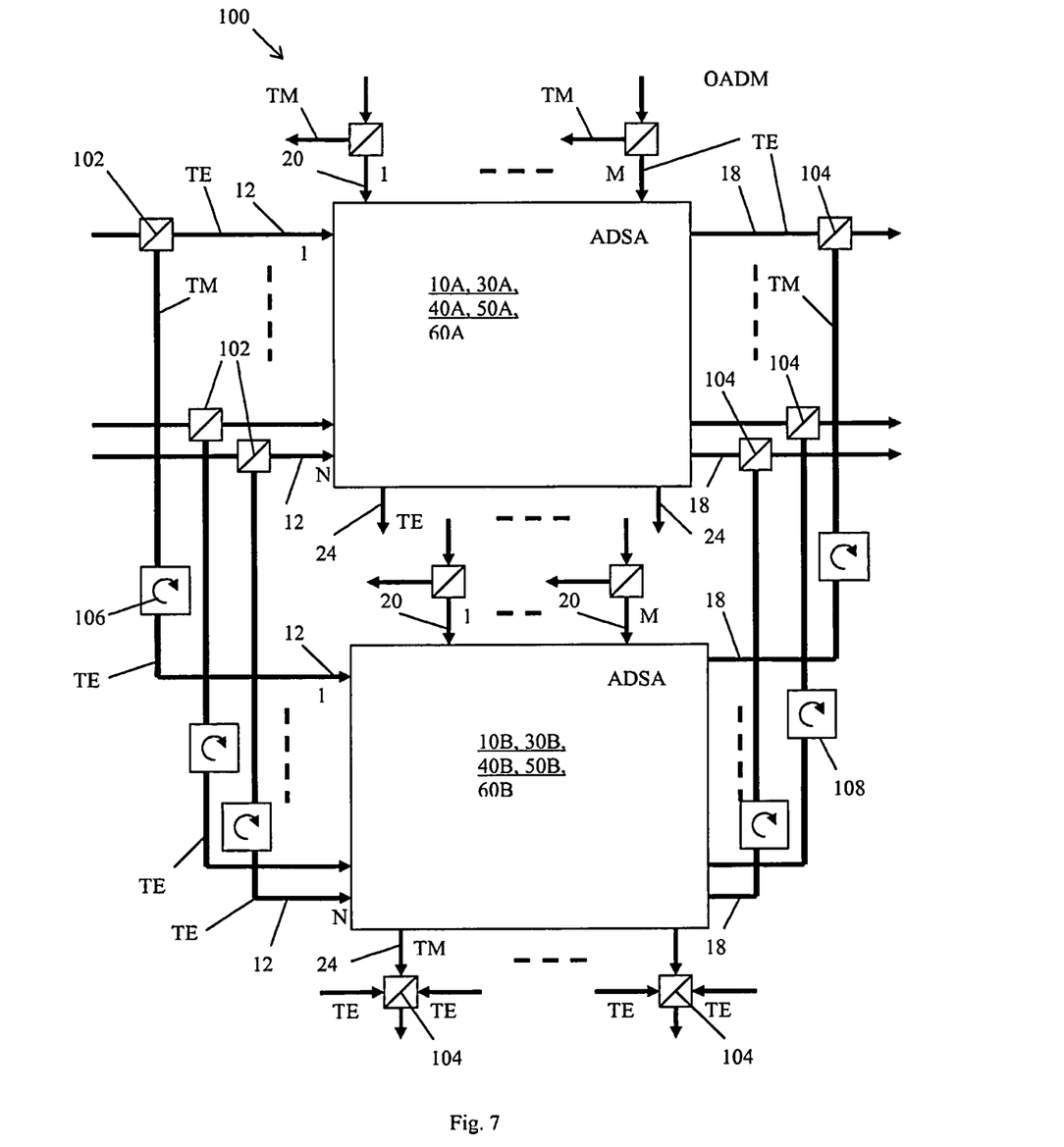
FIG. 7 is a schematic representation of optical add drop multiplexer according to a seventh embodiment of the invention.

A seventh embodiment of the invention provides an OADM 100 as shown in FIG. 7.

In this embodiment the OADM 100 comprises first and second ADSA apparatus 10, 30, 40, 50, 60 as shown in any of FIGS. 1 to 5. The first ADSA apparatus 10A-60A is configured to process optical signals of a first polarisation, TE, and the second ADSA apparatus 10B-60B is configured to process optical signals of an orthogonal polarisation, TM. The OADM 100 may therefore handle wavelength division multiplexed, WDM, input optical signals of an unknown or mixed polarization state.

The OADM 100 further comprises a plurality, N, of polarisation beam splitters, PBS, 102 and a plurality of polarisation beam combiners, PBC, 104. Each PBS 102 is configured to receive a respective WDM input optical signal of unknown or mixed polarisation and to route in a first direction if it is of a first polarisation, TE, and to route it in a second direction it is of the orthogonal polarisation, TM. Each PBC 104 is configured to combine output wavelength multiplexed optical signals of the two polarisations into a WDM output optical signal or drop signal.

The OADM 100 additionally comprises a plurality of polarisation rotators 106 which are provided after each PBS 102 and are configured to rotate the optical signals of the second polarisation, TM, into the first polarisation, TE. A further plurality of polarisation rotators 108 are provided after the output ports of the second ADSA 10B-60B and are configured to rotate the polarisation of the output signals from TE to TM prior to the respective PBC 104. Therefore, although the second ADSA apparatus handles optical signals of the second polarisation, TM, these optical signals are in fact polarisation rotated into the first polarisation, TE, prior to delivery to the second ADSA apparatus, so the structure of each ADSA apparatus is the same.

The OADM 100 therefore has a polarisation diversity structure, with an ADSA apparatus configured to handle each of the TE and TM polarisations.

Figure 8:
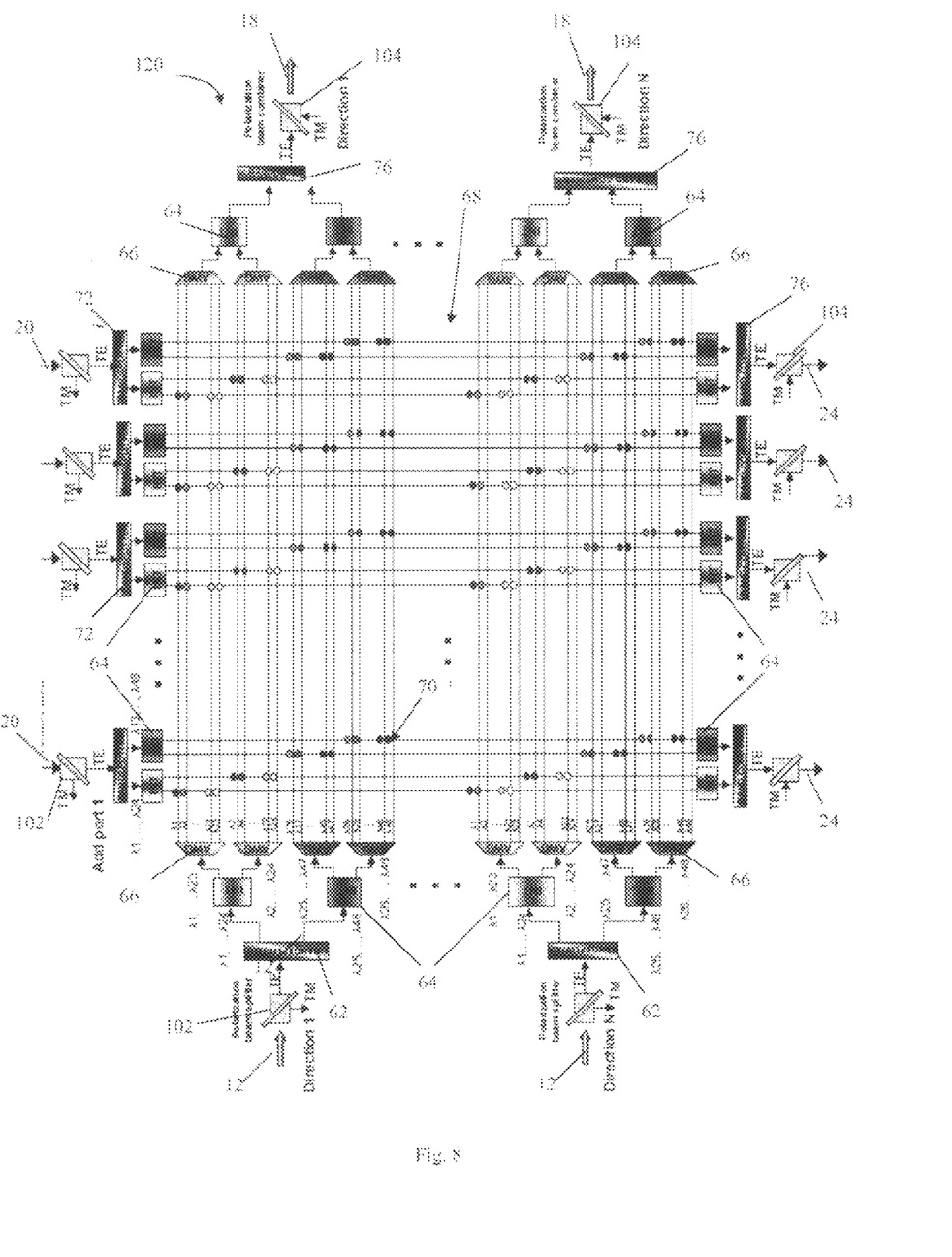
FIG. 8 is a schematic representation of optical add drop multiplexer according to an eighth embodiment of the invention.

An eighth embodiment of the invention provides a reconfigurable optical add drop multiplexer, ROADM, 120 as shown in FIG. 8. The ROADM 120 of FIG. 8 is similar to the OADM 100 of FIG. 7, but specifically uses the ADSA apparatus 60 as shown in FIG. 5. Only one ADSA apparatus is shown for clarity in FIG. 8 but it will be appreciated that two ADSA apparatus are provided, in the same arrangement as shown in FIG. 7.

The ROADM 120 further comprises a plurality, N, of polarisation beam splitters, PBS, 102, provided at each add port. The ROADM 120 is therefore able to receive optical signals to be added which have an unknown polarisation, in the same manner as receiving input signals of unknown polarisation.

Figure 9:
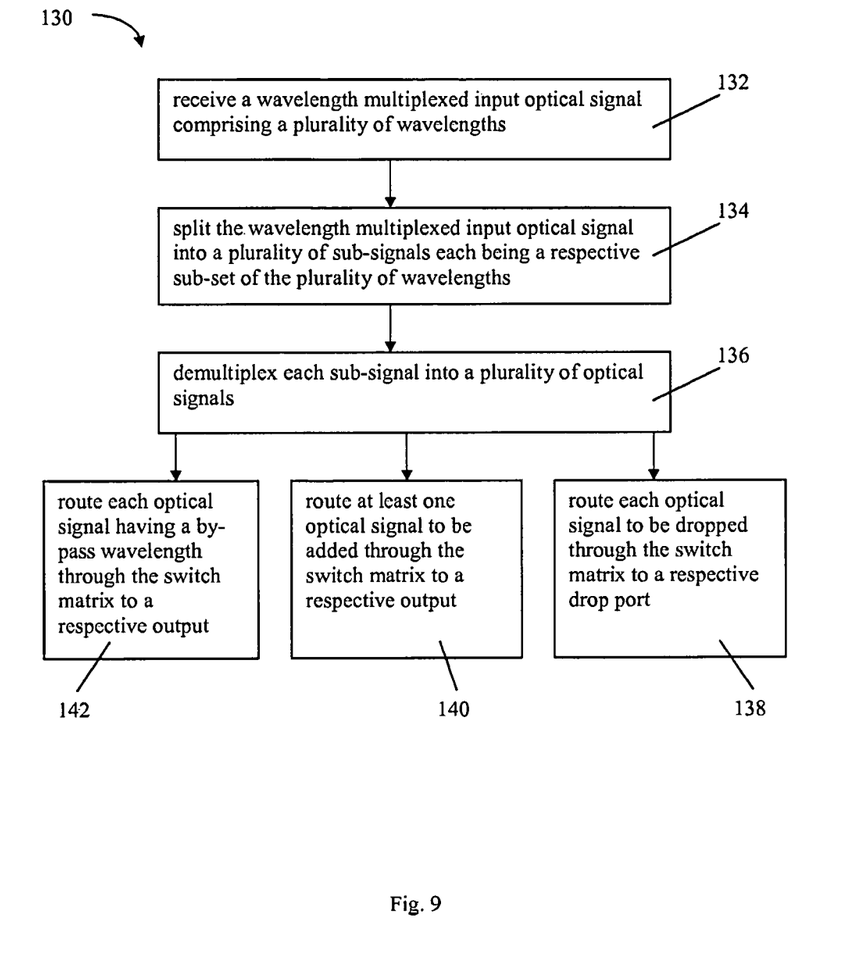
FIG. 9 shows the steps of a method according to a ninth embodiment of the invention of routing optical signals through an optical switch matrix.

A ninth embodiment of the invention provides a method 130 of routing optical signals through an optical switch matrix. The steps of the method are shown in FIG. 9.

The method 130 comprises:
a. receiving a wavelength multiplexed input optical signal comprising a plurality of wavelengths 132;
b. splitting the wavelength multiplexed input optical signal into a plurality of sub-signals each being a respective sub-set of the plurality of wavelengths (134, 152);
c. demultiplexing each sub-signal into a plurality of optical signals (136, 156);
d. routing each one of said optical signals having a by-pass wavelength through the switch matrix to a respective output (142);
e. routing each one of said optical signals to be dropped through the switch matrix to a respective drop port (138); and
f. routing at least one optical signal to be added through the switch matrix to a respective output (140).

Figure 10:
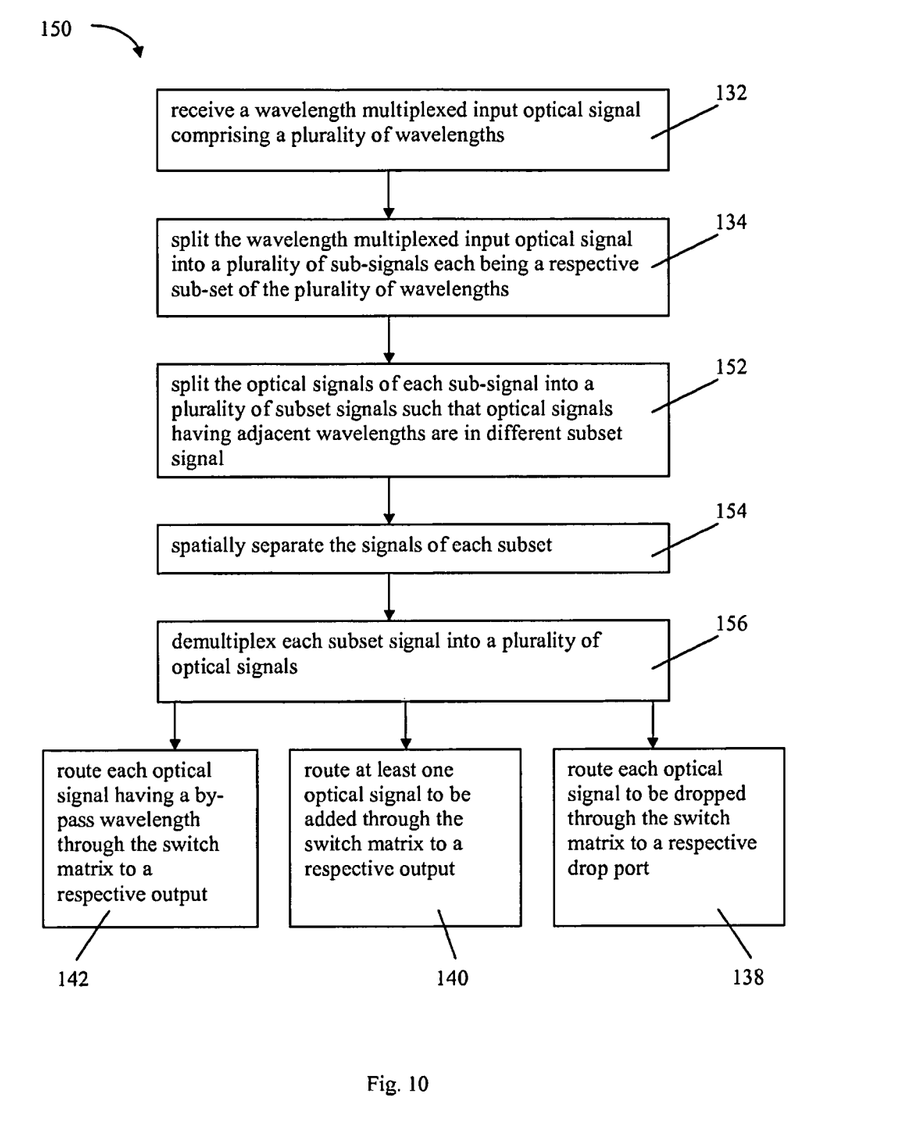
FIG. 10 shows the steps of a method according to a tenth embodiment of the invention of routing optical signals through an optical switch matrix.

A tenth embodiment of the invention provides a method 150 of routing optical signals through an optical switch matrix. The steps of the method are shown in FIG. 10. The method 150 of this embodiment is similar to the method 130 shown in FIG. 9 and the same reference numbers are retained for corresponding steps.

In this embodiment the method further comprises splitting the optical signals of each sub-signal into a plurality of subset signals such that optical signals having adjacent wavelengths are in different subset signal 152. The subset signals are the spatially separated 154. In step c. the subset signals are demultiplexed into a plurality of optical signals 156.

The invention claimed is:
1. An optical routing apparatus comprising:
an optical add and drop switch and aggregator comprising:
a plurality, N, of first wavelength selective routing apparatus each configured to split a respective wavelength multiplexed input optical signal comprising a plurality of wavelengths into a plurality, L, of sub-signals each being a respective sub-set of the plurality of wavelengths;
a plurality of demultiplexers each configured to demultiplex a respective sub-signal into a plurality, K, of optical signals;
a plurality of output ports each configured to output a respective output optical signal;
a plurality of add ports configured to receive optical signals to be added;
a plurality, M, of second wavelength selective routing apparatus each having a plurality, X, of outputs, and each second wavelength selective routing apparatus being configured to receive optical signals from a respective add port and to route each received optical signal to a respective one of its outputs;
a plurality of drop ports configured to output optical signals to be dropped; and
a switch matrix coupled between the demultiplexers, the output ports, the drop ports and the second wavelength selective routing apparatus, the switch matrix comprising a plurality of optical switches arranged in a plurality, XM, of columns and a plurality, KLN, of rows, wherein each row and each column includes multiple optical switches.

2. The optical routing apparatus as claimed in claim 1, wherein each first wavelength selective routing apparatus comprises a wavelength selective optical splitter.

3. The optical routing apparatus as claimed in claim 2, wherein:
each first wavelength selective routing apparatus further comprises a plurality, L, of first wavelength selective optical routing devices each arranged to receive a respective sub-signal, each said first wavelength selective optical routing device comprising a plurality, Y, of outputs and each first wavelength selective optical routing device being configured to route multiple optical signals having different wavelengths to different ones of the plurality of outputs;
each demultiplexer is arranged to receive the optical signals from a respective one of the outputs and is configured to demultiplex the received optical signals into said plurality, K, of optical signals; and
the optical switches of the switch matrix are arranged in a plurality, KLYN, of rows.

4. The optical routing apparatus as claimed in claim 1, wherein each second wavelength selective routing apparatus comprises a second wavelength selective optical routing device having a plurality, Z, of outputs and configured to route each received optical signal to a respective one of the outputs and a said plurality, Z, of first wavelength selective optical routing devices each having a said plurality, Y, of outputs.

5. The optical routing apparatus as claimed in claim 3, wherein each first wavelength selective optical routing device comprises an optical interleaver having first and second outputs, and wherein each wavelength has a wavelength index number and each interleaver is arranged to route optical signals having an even wavelength index number to the first output and is arranged to route optical signals having an odd wavelength index number to the second output.

6. The optical routing apparatus as claimed in claim 1 and further comprising a plurality of multiplexers each configured to multiplex a plurality of output optical signals into a respective output optical sub-signal and a plurality of optical signal combiners each configured to combine a plurality of output optical sub-signals into a respective wavelength multiplexed output optical signal, and wherein the switch matrix is coupled between the demultiplexers, the multiplexers, the drop ports and the second wavelength selective routing apparatus.

7. The optical routing apparatus as claimed in claim 1, wherein each optical switch of the switch matrix comprises at least one of an optical micro-ring resonator, a wavelength selective photonic switch and a broadband photonic switch.

8. The optical routing apparatus as claimed in claim 1, wherein the optical routing apparatus is an optical add drop multiplexer.

9. The optical routing apparatus as claimed in claim 8 and further comprising:
   a second optical add and drop switch and aggregator apparatus; and
   a plurality, N, of polarisation beam splitters each configured to receive a respective wavelength multiplexed input optical signal and to route an input optical signal having a first polarisation into a first direction and to route an input optical signal having a second polarisation into a second direction, wherein a first one of the optical add and drop switch and aggregators apparatus is arranged to receive the input optical signals of the first polarisation and a second one of the optical add and drop switch and aggregators apparatus is arranged to receive the input optical signals of the second polarization,
   wherein the second optical add and drop switch and aggregator apparatus comprises:
   a plurality, N, of first wavelength selective routing apparatus each configured to split a respective wavelength multiplexed input optical signal comprising a plurality of wavelengths into a plurality, L, of sub-signals each being a respective sub-set of the plurality of wavelengths;
   a plurality of demultiplexers each configured to demultiplex a respective sub-signal into a plurality, K, of optical signals;
   a plurality of output ports each configured to output a respective output optical signal;
   a plurality of add ports configured to receive optical signals to be added;
   a plurality, M, of second wavelength selective routing apparatus each having a plurality, X, of outputs, and each said second wavelength selective routing apparatus being configured to receive optical signals from a respective add port and to route each received optical signal to a respective one of its outputs;
   a plurality of drop ports configured to output optical signals to be dropped; and
   a switch matrix coupled between the demultiplexers, the output ports, the drop ports and the second wavelength selective routing apparatus, the switch matrix comprising a plurality of optical switches arranged in a plurality, XM, of columns and a plurality, KLN, of rows.

10. The optical routing apparatus as claimed in claim 9 and further comprising:
   a plurality of first polarization beam combiners each configured to combine optical signals of the first and second polarization to be dropped to a respective drop port; and
   a plurality of second polarization beam combiners each configured to combine output optical signals of the first and second polarization to be output at a respective output.

11. A method of routing optical signals through an optical switch matrix, the method comprising:
   a. receiving a plurality, N, of wavelength multiplexed input optical signals, each comprising a plurality of wavelengths;
   b. splitting each wavelength multiplexed input optical signal into a plurality, L, of sub-signals each being a respective sub-set of the plurality of wavelengths;
   c. demultiplexing each sub-signal into a plurality, K, of optical signals;
   d. coupling each of the plurality, K, of optical signals into one of a plurality, KLN, of rows of the switch matrix, wherein each row includes multiple optical switches;
   e. receiving a plurality, M, of optical signals to be added;
   f. selectively coupling, to the switch matrix, each of the received optical signals to be added as one of a plurality, X, of optical signals, wherein each of the plurality, X, of optical signals is coupled to one of a plurality, XM, of columns of the switch matrix, wherein each column includes multiple optical switches;
   g. routing each one of said optical signals to be dropped through the switch matrix to a respective drop port; and
   h. routing each one of said optical signals to be added through the switch matrix to a respective output.

12. A method as claimed in claim 11, wherein the method further comprises splitting the optical signals of each sub-signal into a plurality of subset signals such that optical signals having adjacent wavelengths are in different subset signals and spatially separating the subset signals, wherein in c. the subset signals of each sub-signal are demultiplexed into a plurality of optical signals.

13. A non-transitory data carrier having computer readable instructions embodied therein for providing access to resources available on a processor, the computer readable instructions comprising instructions to cause the processor to perform a method of routing optical signals through an optical switch matrix, the method comprising:
   a. receiving a plurality, N, of wavelength multiplexed input optical signals, each comprising a plurality of wavelengths;
   b. splitting each wavelength multiplexed input optical signal into a plurality, L, of sub-signals each being a respective sub-set of the plurality of wavelengths;
   c. demultiplexing each sub-signal into a plurality, K, of optical signals;
   d. coupling each of the plurality, K, of optical signals into one of a plurality, KLN, of rows of the switch matrix, wherein each row includes multiple optical switches;
   e. receiving a plurality, M, of optical signals to be added;
   f. selectively coupling, to the switch matrix, each of the received optical signals to be added as one of a plurality, X, of optical signals, wherein each of the plurality, X, of optical signals is coupled to one of a plurality, XM, of columns of the switch matrix, wherein each column includes multiple optical switches;
   g. routing each one of said optical signals to be dropped through the switch matrix to a respective drop port; and
   h. routing each one of said optical signals to be added through the switch matrix to a respective output.

14. The non-transitory data carrier as claimed in claim 13, wherein the method further comprises splitting the optical signals of each sub-signal into a plurality of subset signals such that optical signals having adjacent wavelengths are in different subset signals and spatially separating the subset signals, wherein in c. the subset signals of each sub-signal are demultiplexed into a plurality of optical signals.

* * * * *